United States Patent [19]
Schieke

[11] Patent Number: 6,052,299
[45] Date of Patent: Apr. 18, 2000

[54] ROBUST LC FULL-WAVE BRIDGE RECTIFIER INPUT STRUCTURE

[75] Inventor: Pieter Schieke, Phoenix, Ariz.

[73] Assignee: Microchip Technology Incorporated, Chandler, Ariz.

[21] Appl. No.: 09/007,485

[22] Filed: Jan. 15, 1998

[51] Int. Cl.[7] .................................................. H02M 7/217
[52] U.S. Cl. .......................................................... 363/127
[58] Field of Search ............................... 363/84, 89, 125, 363/127; 323/220, 222, 266, 268

[56] References Cited

U.S. PATENT DOCUMENTS

| | | | |
|---|---|---|---|
| 3,913,125 | 10/1975 | Geller et al. | 357/46 |
| 4,262,574 | 4/1981 | Hoehn | 84/1.01 |
| 4,266,100 | 5/1981 | Hoppner et al. | 179/18 GF |
| 4,777,580 | 10/1988 | Bingham . | |
| 5,449,936 | 9/1995 | Paparo et al. . | |

FOREIGN PATENT DOCUMENTS 2 458 951   1/1981   France .

OTHER PUBLICATIONS

PCT International Search Report dated Jun. 17, 1999.

*Primary Examiner*—Matthew Nguyen
*Attorney, Agent, or Firm*—Ronald L. Chichester; Paul N. Katz; Frohwitter

[57] ABSTRACT

A Full-Wave Bridge Rectifier (FWBR) input structure for use in an electrical system is delineated comprising, in combination, a pair of input nodes, and a pair of parasitic BJTs coupled in parallel with the pair of input nodes wherein each parasitic BJT has more than one collector. The input structure also includes an inductor and a capacitor connected in parallel across the pair of input nodes; however, one or more inductors, one or more capacitors, a transformer, or the like could be substituted. Each parasitic BJT also has a base coupled to ground through a resistor, a collector tied directly to ground, and another collector tied to a supply voltage VDD through a resistor. The area associated with each emitter is smaller than the area associated with their respective collector coupled to VDD. This arrangement of the parasitic BJTs assists in minimizing their gain in order to diminish their draw on a downstream power supply.

20 Claims, 4 Drawing Sheets

ROBUST LC FULL-WAVE BRIDGE RECTIFIER INPUT STRUCTURE

BACKGROUND OF THE INVENTION

1. Field of the Invention

This invention is in the field of input structures for electronic systems and, more particularly, is a robust LC full-wave bridge rectifier input structure implementing minimized gain parasitic transistors.

2. Description of the Related Art

Full-Wave Bridge Rectifier (hereafter "FWBR") input structures are well known to those skilled in the art. Moreover, those skilled in the art know that the return flow path for a FWBR input structure is typically, or at least ideally, comprised of pair of diodes (i.e., one diode per return flow path). When such an FWBR input structure is implemented into an integrated circuit, one problem inherent with prior designs prompted the instant invention. In particular, it is the creation of a parasitic Bipolar Junction Transistor (hereafter "BJT") in each return flow path for the FWBR input structure. Here, the term of art, "parasitic," refers to an element that is unwanted, but nonetheless there. In the FWBR input structures of interest here, using a diode in each return flow path causes the creation—albeit undesirable, but also unavoidable—of a parasitic BJT in each return flow path. Thus, an unwanted (i.e., parasitic) BJT is formed in each return flow path for the FWBR input structure, and the particulars of how this occurs is discussed below.

Assuming the integrated circuit containing the FWBR input structure has a P-type substrate, an $n^+$ material is situated into the substrate, which is generally tied to ground, in order to form a diode. Somewhere else on the integrated circuit's substrate, one will typically have another region of $n^+$ material associated with another component, and this other region of $n^+$ material may be tied to a supply voltage VDD. If that is the case, then although the desire was to establish a diode return flow path for the FWBR input structure, in essence, a parasitic NPN BJT was formed. The $n^+$ material for the diode corresponds to the emitter for the parasitic NPN BJT, while the other $n^+$ material tied to VDD corresponds to the collector for the parasitic NPN BJT, and the base corresponds to the grounded P-type substrate. Even though it was not intended to have a BJT for the FWBR input structure, the creation of the return flow path diode causes the formation of the parasitic BJT, and this results in problems.

Specifically, when the base to emitter junction of the parasitic BJT is forward biased (e.g. when this particular return flow path for the FWBR input structure is used), the parasitic BJT draws current from its collector, and ultimately from VDD. Now, if the power supply for VDD is limited, such as if a small battery, capacitor, or the like is used, then sustaining power could be a problem. In particular, the aforementioned collector drawing on VDD (i.e., on the applicable power storage device) can either limit the ability to charge the applicable power storage device or prematurely discharge it. Note that there would be a parasitic BJT, and its associated power drawing problems just discussed, for each diode in the FWBR input structure (i.e., generally, one per return flow path).

Therefore, there existed a need to provide an improved integrated circuit FWBR input structure having parasitic BJTs of minimized gain.

SUMMARY OF THE INVENTION

An object of the present invention is to provide an integrated circuit FWBR input structure having parasitic BJTs of minimized gain.

Another object of the present invention is to provide an integrated circuit FWBR input structure having parasitic BJTs with more than one collector, in which one is tied to ground and another is tied to VDD through a resistor.

Yet another object of the present invention is to provide an integrated circuit FWBR input structure having parasitic BJTs with an emitter smaller in area than a collector tied to VDD through a resistor.

Still another object of the present invention is to provide an integrated circuit FWBR input structure having parasitic BJTs with a base tied to ground through a resistor.

Yet another object of the present invention is to provide an integrated circuit FWBR input structure having parasitic BJTs that operate in a fold back mode in order to dissipate electrostatic discharges applied to the FWBR input structure.

BRIEF DESCRIPTION OF THE PREFERRED EMBODIMENTS

According to the present invention, an FWBR input structure is disclosed comprising, in combination, a pair of input nodes, and a pair of parasitic BJTs coupled in parallel with the pair of input nodes wherein each parasitic BJT has more than one collector. The FWBR input structure includes an inductor and a capacitor connected in parallel across the pair of input nodes. Preferably, each parasitic BJT comprises an NPN-type parasitic BJT. A first one of the parasitic BJTs has a first collector connected to ground and a second collector coupled to a supply voltage (VDD) through a resistor, and a second one of the parasitic BJTs has a first collector connected to ground and a second collector coupled to VDD through a resistor. The first parasitic BJT has an emitter connected to a first node of the pair of input nodes, and the second parasitic BJT has an emitter connected to a second node of the pair of input nodes. Note that each emitter has an area smaller than its corresponding collector coupled to VDD. Additionally, the first parasitic BJT has a base coupled to ground through a resistor, and similarly, the second parasitic BJT has a base coupled to ground through a resistor.

The FWBR input structure further includes a first plurality of zener diodes connected in series having a first end connected to ground and having a second end connected to a first node of the pair of nodes through a resistor. The FWBR input structure also includes a second plurality of zener diodes connected in series having one end connected to the first end of the first plurality of zener diodes and having another end connected to a second node of the pair of nodes through a resistor. The FWBR input structure further includes first and second MOS transistors wherein the second end of the first plurality of zener diodes is connected to a source of the first MOS transistor and to a gate of the second MOS transistor. The aforementioned other end of the second plurality of zener diodes is connected to a source of the second MOS transistor and to a gate of the first MOS transistor. In the preferred embodiment, the first and second MOS transistors are PMOS-type transistors. Also, note that a drain of the first MOS transistor is connected to a drain of the second MOS transistor.

A supplemental version to the embodiment discussed above includes a first MOS transistor having its source connected to the first collector of the first parasitic BJT and having its drain and gate connected to the emitter of the first parasitic BJT. This supplemental version further includes a second MOS transistor having its source connected to the first collector of the second parasitic BJT and having its drain and gate connected to the emitter of the second parasitic BJT. Here, the first and second MOS transistors are preferably NMOS-type transistors.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
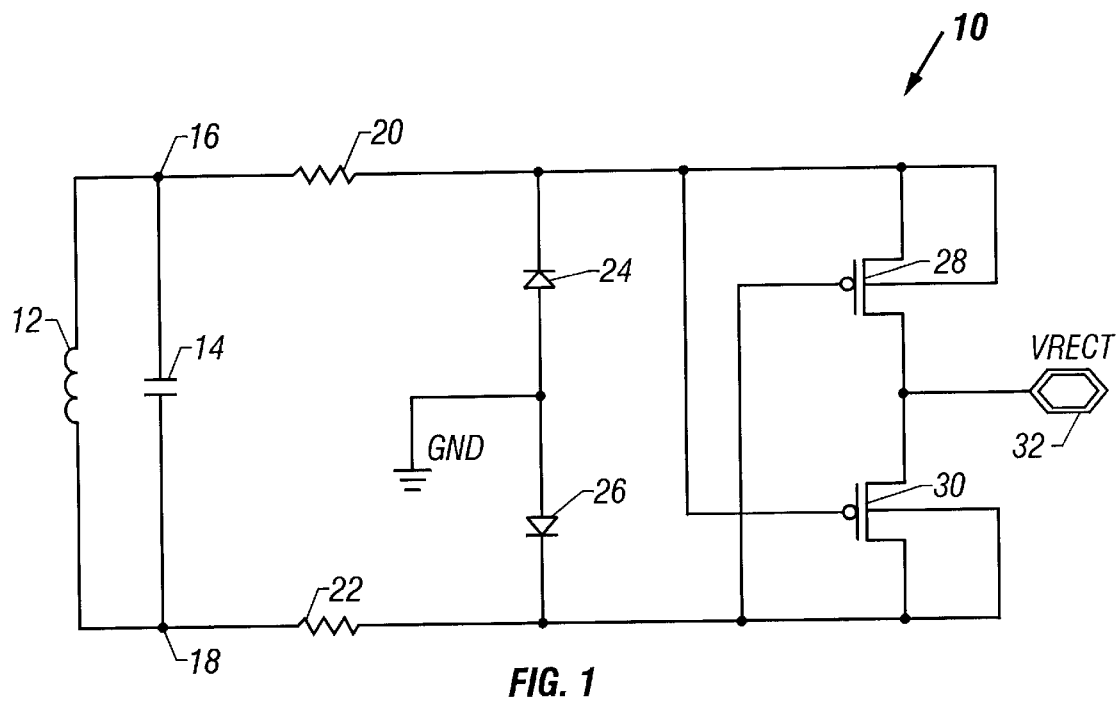
FIG. 1 is a simplified electrical schematic of a prior art, idealized FWBR input structure implemented in an integrated circuit.

Referring to FIG. 1, simplified electrical schematic is shown of a prior art, idealized FWBR input structure implemented in an integrated circuit. The FWBR input structure is generally designated by reference number 10. It includes an inductor 12 coupled in parallel to a capacitor 14 about input nodes 16 and 18. From input nodes 16 and 18, there are resistors 20 and 22, respectively, before reaching the cathode junction of a pair of diodes 24 and 26, respectively. The anode junctions of diodes 24 and 26 are tied to ground. The node at the cathode junction of diode 24 is connected to the source of a PMOS transistor 28, and to the gate of PMOS transistor 30. Similarly, the node at the cathode junction of diode 26 is connected to the source of a PMOS transistor 30, and to the gate of PMOS transistor 28. Lastly, the drain of PMOS transistor 28 is tied to the drain of PMOS transistor 30 at the output node 32 for the FWBR input structure 10.

Nothing more needs to be disclosed with respect to the FWBR input structure 10, since it is well known, other than to say something about why it is called here, an "idealized" FWBR input structure 10. This is because the diodes 24 and 26 are the ideal or desired components for the FWBR input structure 10; however, as discussed in the section entitled "Description of the Related Art," the ideal FWBR input structure 10, when implemented in an integrated circuit, takes on a different form. Specifically, as disclosed in the "Description of the Related Art," a pair of parasitic BJTs 48 and 50 (see FIG. 2) are formed, which are detrimental to operation of the FWBR input structure 10. Thus, these BJTs 48 and 50 are called parasitic (i.e., unwanted, but unavoidable) BJTs.

Figure 2:
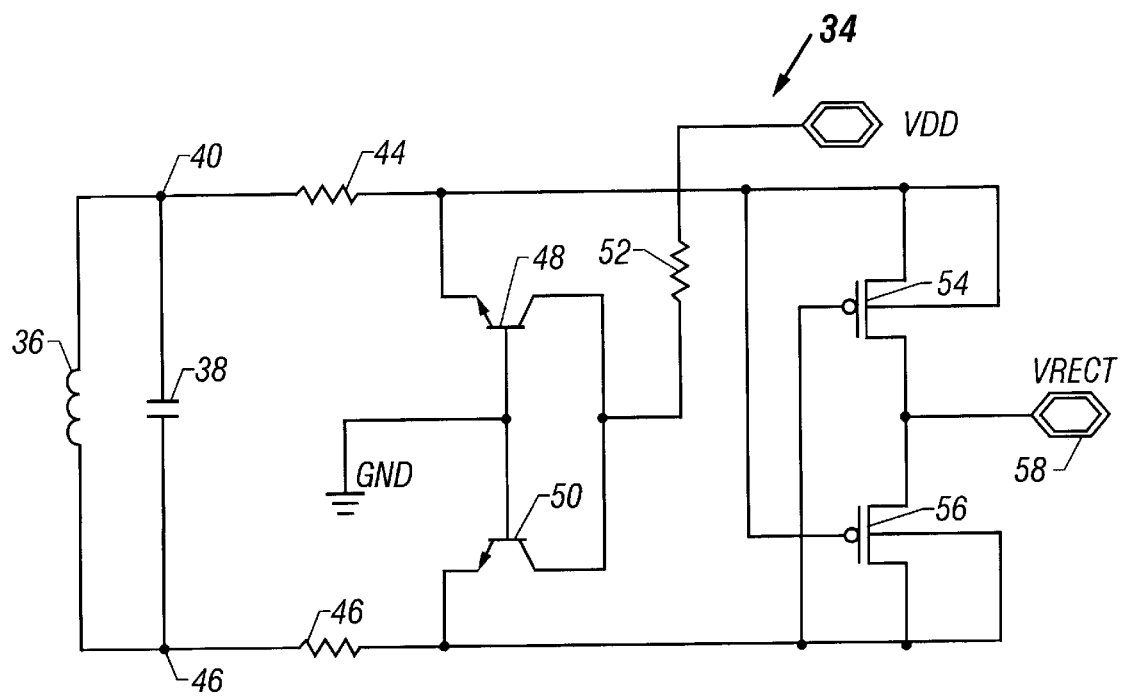
FIG. 2 is a simplified electrical schematic of a prior art FWBR input structure having parasitic BJTs implemented in an integrated circuit.

Referring to FIG. 2, a simplified electrical schematic is shown of a prior art FWBR input structure having parasitic BJTs implemented in an integrated circuit. As mentioned before, implementation of the ideal, prior art FWBR input structure 10 of FIG. 1 into an integrated circuit effectively results in the creation of parasitic BJTs 48 and 50, rather than the ideal diodes 24 and 26 (see FIG. 1) by themselves. Otherwise, FIGS. 1 and 2 are the same. The FWBR input structure of FIG. 2 is generally designated by reference number 34. It includes an inductor 36 coupled in parallel to a capacitor 38 about input nodes 40 and 42. From input nodes 40 and 42, there are resistors 44 and 46, respectively, before reaching the emitter junctions of a pair of parasitic BJTs 48 and 50, respectively. The base junctions of parasitic BJTs 48 and 50 are tied to ground, and their collector junctions are tied to a supply voltage VDD through a resistor 52. The node at the emitter junction of parasitic BJT 48 is connected to the source of a PMOS transistor 54, and to the gate of a PMOS transistor 56. Similarly, the node at the emitter junction of parasitic BJT 50 is connected to the source of PMOS transistor 56, and to the gate of PMOS transistor 54. Lastly, the drain of PMOS transistor 54 is tied to the drain of PMOS transistor 56 at the output node 58 for the FWBR input structure 34.

Nothing more needs to be disclosed with respect to the FWBR input structure 34, since it is well known, other than to reiterate the problem caused by the creation of parasitic BJTs 48 and 50. The flow path for the FWBR input structure 34, which is analogous to that for the FWBR input structure 10 of FIG. 1, is as follows: 1) an electromagnetic field is applied across the tuned LC input (i.e. inductor 36 and capacitor 38) to create alternating complementary current at input nodes 40 and 42; 2) assuming a positive potential at node 40, current flows through resistor 44; 3) since a negative potential is applied to the gate of PMOS transistor 54, it will be on to conduct current to the output load via node 58; and 4) the return path encompasses current flow via ground, through the base-to-emitter junction of parasitic BJT 50, and through the resistor 46. When the polarity of the input nodes 40 and 42 shifts, the analogous flow path for the corresponding portions of the FWBR input structure 34 are used. In either case though, the forward biasing of the base-to-emitter junction (i.e., the "ideal" diode 24 or 26 of FIG. 1) for either parasitic BJT 48 or 50, causes a resultant current draw on the subject parasitic BJT's collector via VDD, and ultimately some power storage device such as a battery, capacitor, or the like. Since the parasitic BJTs such as 48 and 50 are unavoidable, it was desirable to minimize their gain, and their resultant drain on the power storage device—this was one of the primary aims of the instant invention shown in FIGS. 3 and 4.

Figure 3:
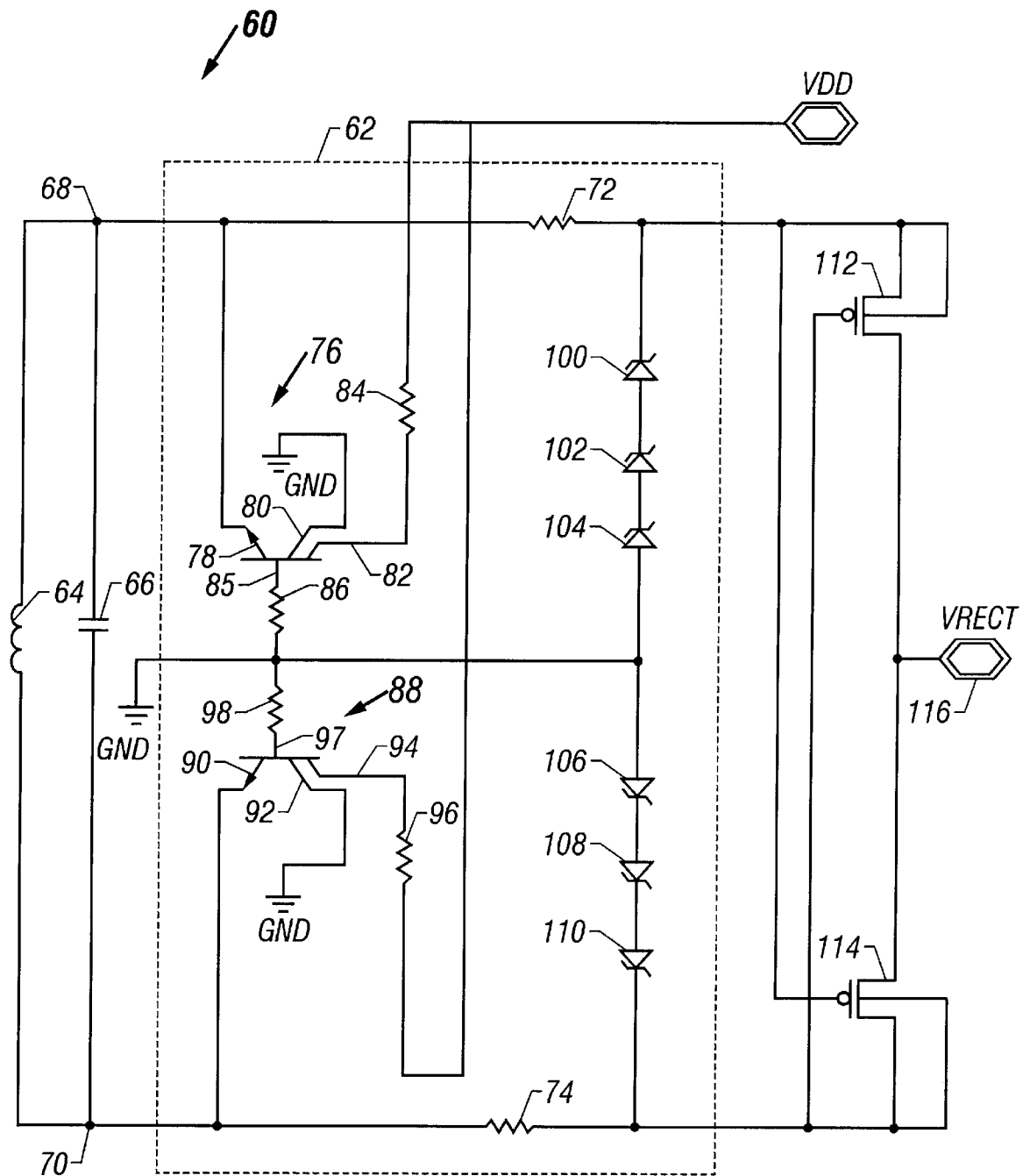
FIG. 3 is a simplified electrical schematic of a new FWBR input structure having parasitic BJTs of minimized gain in an integrated circuit.

Now referring to FIG. 3, a simplified electrical schematic is shown of a new FWBR input structure, generally designated by reference number 60, and having parasitic BJTs of minimized gain in an integrated circuit. Note that the term "FWBR input structure" generally refers to all that is shown in FIG. 3; however, it will become apparent that the portion of primary concern is shown in the dashed-line box labelled by reference number 62. Nonetheless, the FWBR input structure 60 comprises, in combination, a pair of input nodes 68 and 70, and a pair of parasitic BJTs 76 and 88 coupled in parallel with the pair of input nodes 68 and 70 wherein each parasitic BJT 76 and 88 has more than one collector. Note that the FWBR input structure 60 includes an inductor 64 and a capacitor 66 connected in parallel across the pair of input nodes 68 and 70. The inductor 64 and capacitor 66 are tuned to a resonant frequency of an electromagnetic transmission, which provides power and/or data to circuitry downstream of the LC pair (i.e., 64 and 66). The LC pair therefore acts, in essence, as an "antenna" for the FWBR input structure 60, and circuitry located downstream of output node 116. Note that the LC pair 64 and 66 is shown comprising single components; however, those skilled in the art recognize that other tuned frequency "antennas" well known to those skilled in the art could be implemented, if desired. For example, the "antenna" could be implemented by using the LC pair, one or more inductors, one or more capacitors, a transformer, or the like. Also, note that each parasitic BJT 76 and 88 comprises an NPN-type parasitic BJT; however, those skilled in the art realize that other BJTs such as PNP-type parasitic BJTs could, in a slightly different situation, be implemented, if desired.

A first parasitic BJT 76 has a first collector 80 connected to ground and a second collector 82 coupled to VDD through resistor 84. Similarly, a second parasitic BJT 88 has a first collector 92 connected to ground and a second collector 94 coupled to VDD through resistor 96. The first parasitic BJT 76 has an emitter 78 connected to a first node 68 of the pair of input nodes 68 and 70. The second parasitic BJT 88 has an emitter 90 connected to a second node 70 of the pair of input nodes 68 and 70. Each emitter 78 and 90 has an area smaller than its corresponding collector 82 and 94, respectively, coupled to VDD. Additionally, the first parasitic BJT 76 has a base 85 coupled to ground through a resistor 86, and the second parasitic BJT 88 has a base 97 coupled to ground through a resistor 98.

The FWBR input structure 60 further includes a first plurality of zener diodes 100–104 connected in series having a first end connected to ground and having a second end connected to the first node 68 through a resistor 72. Additionally, a second plurality of zener diodes 106–110 are connected in series. The second plurality of zener diodes 106–110 have one end connected to the first end of the first plurality of zener diodes 100–104, and have another end connected to the second node 70 through a resistor 74. From the output nodes of the dashed-line box labelled 62, there are a number of different combinations of circuit elements well known to those skilled in the art to complete the FWBR input structure 60; however, only one such combination is shown here for the sake of simplification of the drawings. The combination of such circuit elements shown in FIG. 3 (and in FIG. 4) includes first 112 and second 114 MOS transistors wherein the second end of the first plurality of zener diodes 100–104 is connected to a source of the first MOS transistor 112 and to a gate of the second MOS transistor 114. The other end of the second plurality of zener diodes 106–110 is connected to a source of the second MOS transistor 114 and to a gate of the first MOS transistor 112. The drain of the first MOS transistor 112 is connected to a drain of the second MOS transistor 114 to form an output node 116. Also, note that the first 112 and second 114 MOS transistors are preferably PMOS-type transistors; however, in situations well known to those skilled in the art, NMOS-type transistors could be implemented.

Figure 4:
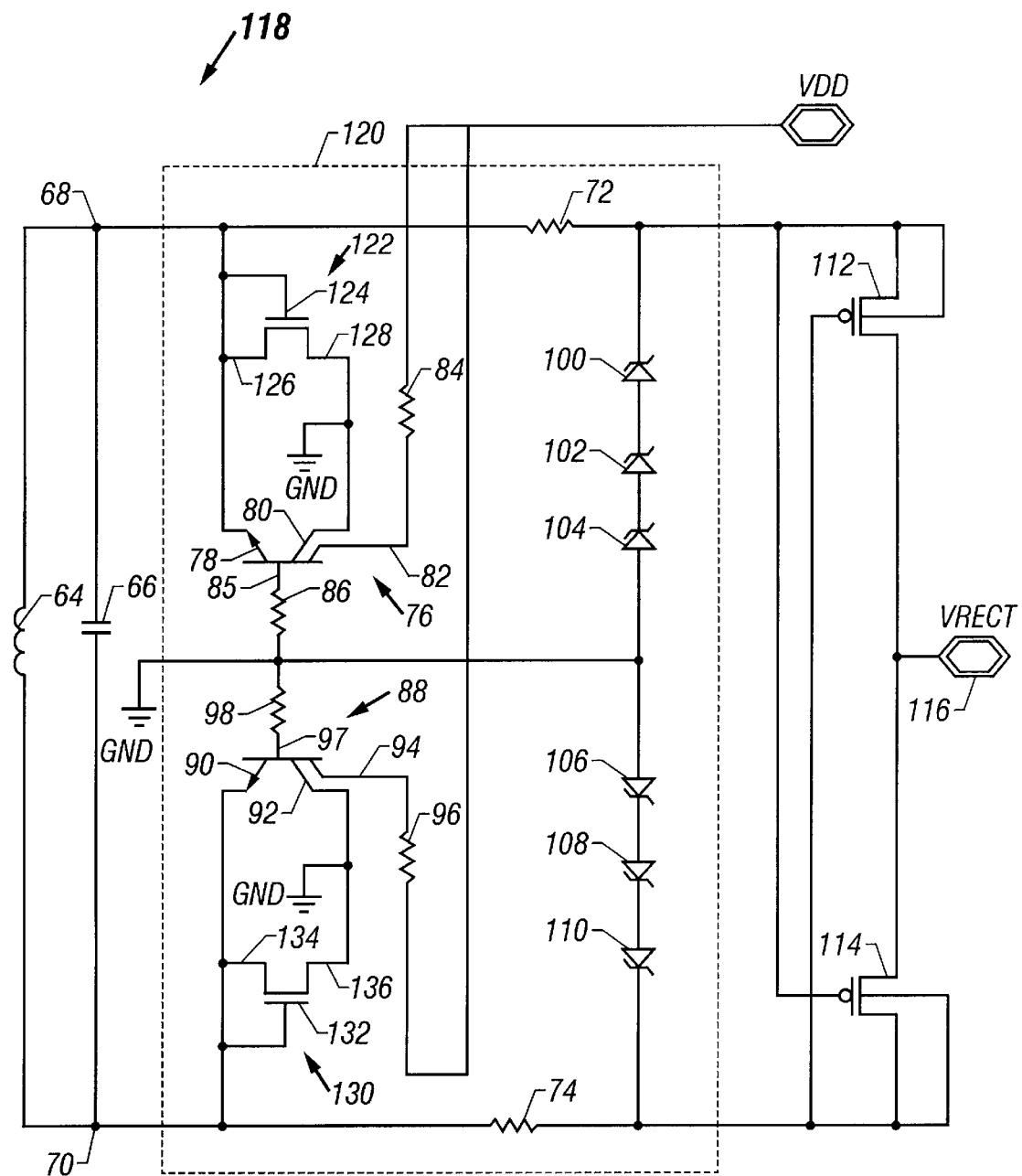
FIG. 4 is a simplified electrical schematic of another version of a new FWBR input structure having parasitic BJTs of minimized gain in an integrated circuit.

Other such well known combinations of circuit elements that could be implemented with the circuitry in the dashed-line box labelled 62, in lieu of elements 112 and 114 as shown in FIGS. 3 and 4, are now set forth. Note also that these other well known combinations could be used with the FWBR input structure 118 of FIG. 4. First, one could have more than two MOS transistors. For example, one could include two or more series-connected PMOS-type transistors, in lieu of the single PMOS transistor 112, and these two (or more) series-connected PMOS-type transistors would be hooked up just like PMOS transistor 112. In this case, there would also be two or more series-connected PMOS-type transistors, in lieu of the single PMOS transistor 114, which would be hooked up just like PMOS transistor 114. A second alternative would use two NMOS transistors in place of PMOS transistors 112 and 114. Here, one NMOS transistor would have its drain and gate tied to the upper output node of 62 (or 120 in FIG. 4), and its source tied to the source of the other NMOS transistor for forming the output node 116 for the FWBR input structure 60 or 118. The second NMOS transistor would have its gate and drain tied to the other output node of 62 (or 120 in FIG. 4).

In summary, the configuration of MOS transistors 112 and 114 in FIGS. 3 and 4 is shown only as one possible way of completing the FWBR input structures 60 and 118. Those skilled in the art will fully realize that there are numerous ways of taking the signals at the output nodes from the dashed-line box 62 (or 120 in FIG. 4) and processing them to complete the full-wave rectification. It is considered within the scope of the invention here to take any one of the many different combinations of elements, well known to those skilled in the art, and incorporate them in place of transistors 112 and 114. Thus, one can envision use of PMOS transistors alone, NMOS transistors alone, PMOS and NMOS transistors together, in series, in parallel, or in some combination thereof. In short, any well known circuitry that could be implemented in lieu of PMOS transistors 112 and 114 is considered well within the scope of the invention here.

FIG. 4 shows a simplified electrical schematic of another version of the new FWBR input structure, generally designated by reference number 118, and having parasitic BJTs of minimized gain in an integrated circuit. The FWBR input structure 118 of FIG. 4 is identical to that shown in FIG. 3, with one modification, and therefore the FWBR input structure 118 will not be discussed in detail. In the dashed-line box 120, each of the parasitic BJTs 76 and 88 have an MOS device coupled to them—this is the modification. In particular, the FWBR input structure 118 includes a first MOS transistor 122 having its source 128 connected to the first collector 80 of the first parasitic BJT 76, and having its drain 126 and gate 124 connected to the emitter 78 of the first parasitic BJT 76. 19. A second MOS transistor 130 is also included having its source 136 connected to the first collector 92 of the second parasitic BJT 88, and having its drain 134 and gate 132 connected to the emitter 90 of the second parasitic BJT 88. In the preferred embodiment, the first 122 and second 130 MOS transistors are NMOS-type transistors; however, those skilled in the art realize that under different circumstances, PMOS-type transistors could be implemented.

Figure 5:
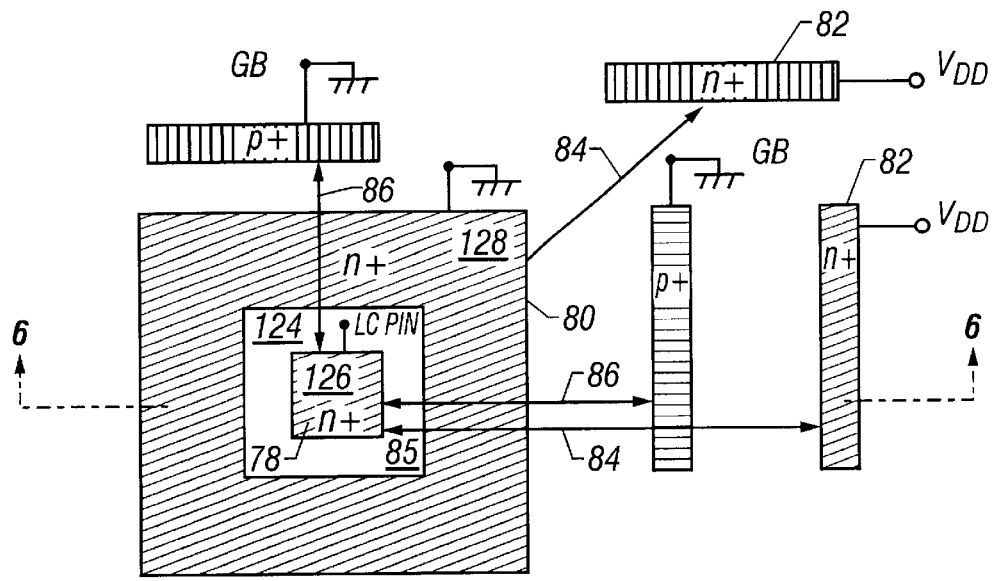
FIG. 5 is a simplified drawing showing one possible manner of physically implementing a portion of the FWBR input structure of FIG. 4. Note that the portion shown here equates to the portion of FIG. 4 having the same reference numbers as those shown in FIG. 5.
Figure 6:
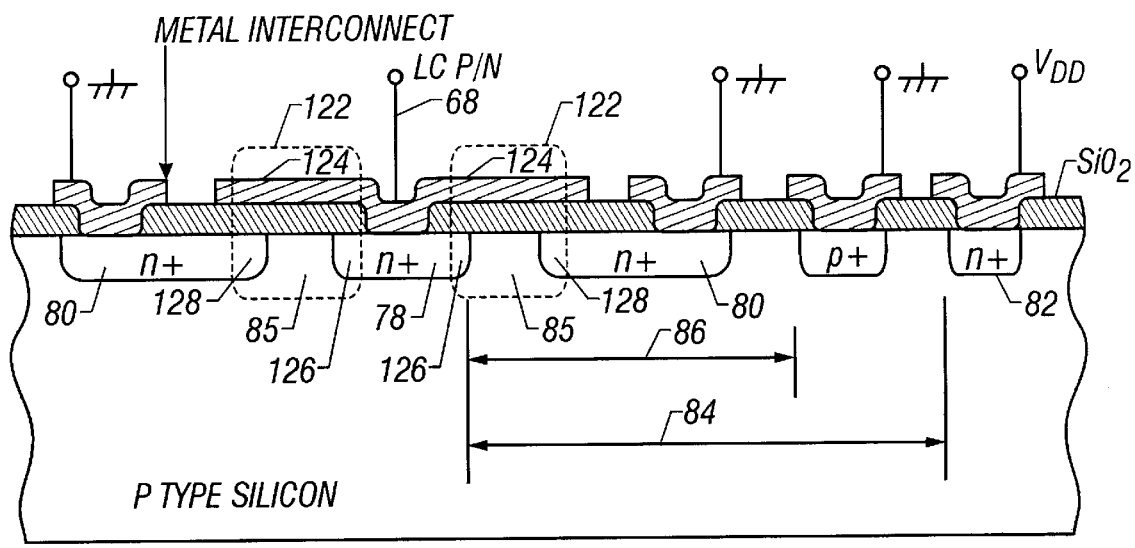
FIG. 6 is a cross-sectional view of the physical implementation from FIG. 5 taken along line 6—6.

Referring to FIGS. 5 and 6, one possible manner of physically implementing the instant invention into silicon is shown; however, note that only a portion of the instant invention is shown in FIGS. 5 and 6 (i.e., that portion corresponding to like numbers in FIGS. 3 and 4). Nonetheless, those skilled in the art of implementing electrical devices, systems, and the like into silicon understand what the remainder of the instant invention would look like in FIGS. 5 and 6. Moreover, those skilled in the relevant art also understand that the manner shown in FIGS. 5 and 6 for physically implementing the instant invention into silicon comprises but one of the many possible manners of implementation.

More specifically, the NFET device 122 and the parasitic npn BJT 76 of FIG. 4 are shown in FIGS. 5 and 6 on a p-type silicon substrate. FIG. 5 shows a top view, without metallization, while FIG. 6 shows a side cross-sectional view taken along line 6—6 of FIG. 5. The NFET device 122 is located between nodes 128, 126, and 124, where node 126 forms the drain and node 128 the source for device 122. The parasitic npn BJT 76 is located between nodes GB, 82, 80, and 78. The emitter of parasitic npn BJT 76 is formed by node 78, its base comprises node 85, and the grounded base contact is formed by node GB. Note that the abbreviation "GB" stands for grounded base, which is situated (as viewed in FIG. 4) between resistors 86 and 98. The base resistance 86 is associated with the distance from the actual base (85 in FIG. 4) of the parasitic npn BJT 76 to the GB node. Note that the base contact GB, and therefore the base resistance 86, may be distributed depending on the layout of the surrounding circuitry. The grounded collector 80 of the parasitic npn BJT 76 completely surrounds emitter 78 in this implementation. The high voltage collector 82 is situated some distance away from the base 85 of the parasitic npn BJT 76 and has an implied resistance 84. The high voltage collector 82, and therefore the resistance 84, may also be distributed as the layout of the surrounding circuitry dictates. Note that where an area of the Figures is labelled with more than one reference number, this is meant to indicate that the area is shared. For example, the area labelled 124 and 85 is shared between the corresponding components labelled in FIG. 4, and the area labelled 128 and 80 is shared between its corresponding components from FIG. 4. Additionally, note that the base 86 and collector 84 resistances are the sum of more than one leg in FIG. 5. Lastly, note that an even more detailed description of FIGS. 5 and 6 is not required here, as those skilled in the art, after a comparison of the full patent disclosure including all of the Figures, understand the finer details demonstrated by FIGS. 5 and 6.

OPERATION

Again, recall that FIGS. 1 and 2 show previous art, and therefore the operation of these Figures need not be discussed. Turning the focus to FIG. 3, one begins with the assumption that the LC time constant associated with inductor 64 and capacitor 66 has been chosen to be tuned to a frequency of an electromagnetic transmission. Here, that frequency is in the vicinity of 125 KHz; however, other frequencies could be used with other LC time constants. Again note however that the "antenna" can be implemented using the LC pair, one or more inductors, one or more capacitors, a transformer, or the like. The LC pair (i.e., 64 and 66) acts like an "antenna" for inputting power and/or data to circuitry downstream of output node 116. The FWBR input structure 60 (or 118 of FIG. 4) simply provides a rectified signal for use by downstream loads (not shown). The electromagnetic signal input to the LC pair (i.e., 64 and 66) causes alternating complementary current at input nodes 68 and 70. In other words, when the potential at node 68 is positive, it is negative at node 70, and vice versa.

In order to understand the FWBR input structure's flow path, consider the example where node 68 is positive and node 70 is negative. Here, the gate of transistor 112 is low, so it conducts current from node 68, through resistor 72, through transistor 112, through the output node 116, and to the downstream load. To complete the return flow path, current flows from ground, through resistor 98, through the base-to-emitter junction of parasitic BJT 88, and to node 70. The return flow path also includes current flow from the grounded collector 92 to the emitter 90, and to the node 70. When polarity of the input nodes 68 and 70 shifts, the supply flow path will be similar. Namely, the gate of transistor 114 is low, so it conducts current from node 70, through resistor 74, through transistor 114, through the output node 116, and to the downstream load. To complete the return flow path, current flows from ground, through resistor 86, through the base-to-emitter junction of parasitic BJT 76, and to node 68. The return flow path here also includes current flow from the grounded collector 80 to the emitter 78, and to the node 68.

In the past, current flow through the base-to-emitter junctions of parasitic BJTs (e.g., 48 and 50 in FIG. 2) caused current draw on the downstream power supply (not shown, but which supplies VDD) via the collector tied to VDD. The parasitic BJTs here 76 and 88 have been modified to minimize their gain, and thereby minimize the amount of current drawn from the downstream power supply whether it be a battery, a capacitor, or some other power storage device. A number of features have been built into parasitic BJTs 76 and 88 to minimize their gain. By way of example, these features will be discussed for parasitic BJT 76; however, note that similar changes are also included for parasitic BJT 88. First, in a manufacturing manner well known to those skilled in the art, the area of emitter 78 is purposefully made smaller than the area for collector 82. There is no magic number for how small the emitter 78 should be or how small it should be relative to the collector 82 other than to say that the emitter's area should be smaller than the area for collector 82. Ideally, the area for emitter 78 should be no larger than the area required to support the anticipated current that will be drawn through the emitter's return flow path. In the preferred embodiment, that return flow path current typically falls in the range of 10–50 ma; however, this range is not considered limiting. Rather, in general, the emitter's area should be no larger than that required to support the anticipated return flow path current, and in any case, not larger than the area of collector 82.

A second feature is the addition of a second large area collector 80 connected to ground. The area of collector 80 is certainly larger than the area of the emitter 78, and for optimum operation, the larger the area for collector 80, the better; however, design space constraints may limit the area for collector 80 to a reasonably large size. A third feature implemented in the parasitic BJT 76 comprises adding a resistor 86 between its base 85 and ground. A fourth feature added to parasitic BJT 76 was increasing the resistance 84 between VDD and the collector 82. Note that the fourth feature is represented by including a separate resistor 84 and 96 for each BJT's second collector 82 and 94 (instead of a single, shared resistor like 52 in FIG. 2). These four features, whether taken singly, or in combination, act to minimize the gain of the parasitic BJTs 76 and 88 in a way that reduces the draw by these devices on the downstream power supply. To exemplify the success of this new implementation, consider the following data. In prior FWBR input structures like 34 (see FIG. 2), a design 1 ma output through the base-to-emitter return flow paths of the parasitic BJTs 48 and 50 caused an approximate draw of 0.5 ma out of a downstream battery. With the new FWBR input structure like 60 or 118, a similar design 1 ma output, draws only 100 micro-amps out of the battery.

The parasitic BJTs 76 and 88 are also put to constructive use by having them act as "fold-back devices" (a term well known to those skilled in the art) during Electro-Static Discharge (hereafter "ESD") conditions. An ESD condition occurs when a very high, momentary pulse of voltage is applied to the input nodes 68 and 70. Such a condition may occur from the unintentional touching of the FWBR input structure 60, causing a spark which could result in a pulse of high voltage at the input nodes 68 and 70—such a pulse could attain 4–5 KVolts for example. At such a high voltage, the parasitic BJTs 76 or 88 transmute into a low resistance, fold-back or snap-back mode of operation. By way of example, assume that an ESD condition causes a high voltage spike at input node 68. Here, the zener diodes 100–104 will clamp the downstream voltage at approximately 15 volts, thereby protecting downstream circuitry. If the voltage spike exceeds this value, then the parasitic BJT 76 will go into fold-back mode. Per the standard operation of a BJT like parasitic BJT 76, when $V_{CE}$ attempts to exceed a certain snap-back value for the transistor, the $V_{CE}$ curve drops off significantly. What this means can be shown by way of example. Assume that the ESD condition creates 4 amps to be dissipated. Without fold-back operation of the parasitic BJT 76, the 4 amps would be dissipated by the zener diode group 100–104 at 15 volts, thereby dissipating 60 watts (i.e., 4 Amps×15 Volts=60 Watts). However, when the $V_{CE}$ of the parasitic BJT 76 attempts to exceed the snap-back level, the $V_{CE}$ for parasitic BJT 76 will drop off to a relatively low level, like 5 volts, for example. Therefore, only 20 Watts will be dissipated (i.e., 4 Amps×5 Volts=20 Watts). This is just standard BJT operation, and either parasitic BJT 76 or 88 can operate in snap-back or fold-back mode in response to an ESD condition.

During ESD conditions, when a high pulse is applied to the LC pair (i.e. 64 and 66), the emitter 78 or 90 of one of the parasitic BJTs 76 or 88 will act as a collector, while the grounded collector 80 or 92 acts as an emitter. The base 85 or 97 of the affected parasitic BJT 76 or 88 floats, and as soon as the voltage difference between the acting collector and the acting emitter is high enough, the parasitic BJT 76 or 88 will fold back into a low resistance mode, absorbing all of the unwanted energy from the ESD pulse. Again, either parasitic BJT 76 or 88 can operate in the fold-back mode per standard BJT operation.

The zener diode groups 100–104 and 106–110 ensure that the voltage down stream of the resistors 72 and 74, respectively, don't exceed a pre-determined level, thereby protecting circuitry downstream of resistors 72 and 74. In the preferred embodiment, the zener diode groups 100–104 and 106–110 limit the downstream voltage to approximately 15 volts; however, those skilled in the art realize that more or less than groups of three zener diodes, or zener diodes with a different rating (i.e., other than approximately 5 volts each), could be used to achieve different downstream voltage limitations. The addition of the two groups of zener diodes 100–104 and 106–110 further enhanced the robustness of the FWBR input structure 60. They ensure that the input voltage is clamped at a certain level, but when an ESD pulse is experienced, the voltage level on the BJT side of resistors 72 or 74 will rise high enough to have the parasitic BJTs 76 or 88 go into a low resistance, fold-back mode to absorb the energy associated with the ESD pulse.

Referring to FIG. 4, a simplified electrical schematic is shown of another embodiment of the new FWBR input structure, generally designated by reference number 118. It is essentially identical to the FWBR input structure 60 from FIG. 3, with the exception that the dashed-line box labelled 120 includes some supplemental circuitry. In particular, MOS transistors 122 and 130 have been added. These thick oxide field NMOS transistors 122 and 130 are connected between the grounded collector and the emitter or their respective parasitic BJTs 76 and 88. This addition implies that an additional conductive path may be formed during high voltage conditions (e.g., ESD conditions) when the threshold voltage of the thick oxide over the base of the respective parasitic BJT 76 or 88 is exceeded. When the threshold voltage of the thick oxide over the base of one of the parasitic BJTs 76 or 88 is exceeded, the respective thick oxide field NMOS transistor 122 or 130 creates a short circuit to assist during the ESD condition. For example, if a positive potential is applied at the input node 68 during an ESD condition, the gate 124 of transistor 122 will be forward biased, causing the drain 126 and the source 128 to be tied together. This puts the collector 80 and the emitter 78 of the parasitic BJT 76 at the same potential, which form a low resistance path, and the ESD pulse will be further assisted in its dissipation to ground. Note that the other thick oxide field NMOS transistor 130 operates identically.

Although the invention has been particularly shown and described with reference to a preferred embodiment thereof, it will be understood by those skilled in the art that changes in form and detail may be made therein without departing from the spirit and scope of the invention.

What is claimed is:

1. A Full-Wave Bridge Rectifier (FWBR) input structure comprising, in combination:

first and second input nodes; and first and second parasitic Bipolar Junction Transistors (BJTs) wherein each parasitic BJT has at least two collectors, said first parasitic BJT coupled to said first input node and said second parasitic BJT coupled to said second input node.

2. The FWBR input structure of claim 1 wherein an inductor is connected between said first and second input nodes, and a capacitor is connected between said first and second input nodes.

3. The FWBR input structure of claim 1 wherein each parasitic BJT comprises an NPN-type parasitic BJT.

4. The FWBR input structure of claim 1 wherein said first input node is connected to an emitter junction of said first parasitic BJT, and wherein said second input node is connected to an emitter junction of said second parasitic BJT.

5. The FWBR input structure of claim 1 wherein a base junction of said first parasitic BJT is coupled to ground through a first resistor, and wherein a base junction of said second parasitic BJT is coupled to ground through a second resistor.

6. The FWBR input structure of claim 1 wherein said first parasitic BJT has one of its collectors connected to ground, and wherein said second parasitic BJT has one of its collectors connected to ground.

7. The FWBR input structure of claim 1 wherein said first parasitic BJT has one of its collectors coupled to a supply voltage (VDD) through a resistor, and wherein said second parasitic BJT has one of its collectors coupled to VDD through another resistor.

8. The FWBR input structure of claim 1 wherein said first parasitic BJT has a first collector connected to ground and a second collector coupled to a supply voltage (VDD) through a first resistor, and wherein said second parasitic BJT has a first collector connected to ground and a second collector coupled to VDD through a second resistor.

9. The FWBR input structure of claim 8 wherein said first parasitic BJT has an emitter connected to said first input node, and wherein said second parasitic BJT has an emitter connected to said second input node.

10. The FWBR input structure of claim 9 wherein each emitter of said first and second input nodes has an area smaller than its corresponding collector coupled to VDD.

11. The FWBR input structure of claim 8 wherein said first parasitic BJT has a base coupled to ground through a third resistor, and wherein said second parasitic BJT has a base coupled to ground through a fourth resistor.

12. The FWBR input structure of claim 8 further including a first plurality of zener diodes connected in series, said first plurality of zener diodes having a first end connected to ground and having a second end connected to said first input node through a fifth resistor.

13. The FWBR input structure of claim 12 further including a second plurality of zener diodes connected in series, said second plurality of zener diodes having a first end connected to ground and having a second end connected to said second input node through a sixth resistor.

14. The FWBR input structure of claim 13 further including first and second MOS transistors wherein said second end of said first plurality of zener diodes is connected to a source of said first MOS transistor and to a gate of said second MOS transistor.

15. The FWBR input structure of claim 14 wherein said second end of said second plurality of zener diodes is connected to a source of said second MOS transistor and to a gate of said first MOS transistor.

16. The FWBR input structure of claim 14 wherein said first and second MOS transistors are PMOS-type transistors.

17. The FWBR input structure of claim 14 wherein a drain of said first MOS transistor is connected to a drain of said MOS transistor.

18. The FWBR input structure of claim 9 further including a first MOS transistor having its source connected to ground and having its drain and gate connected to said emitter of said first parasitic BJT.

19. The FWBR input structure of claim 18 further including a second MOS transistor having its source connected to ground and having its drain and gate connected to said emitter of said second parasitic BJT.

20. The FWBR input structure of claim 19 wherein said first and second MOS transistors are NMOS-type transistors.

* * * * *